United States Patent [19]

Moran

[11] 3,818,352

[45] June 18, 1974

[54] AUTOMATIC TELEVISION PROGRAMMER

[76] Inventor: Robert L. Moran, 4 Mackintosh St., Franklin, Mass. 02038

[22] Filed: May 1, 1972

[21] Appl. No.: 249,360

[52] U.S. Cl. .............................................. 325/396

[51] Int. Cl. .............................................. H04b 1/16

[58] Field of Search.................... 58/33; 178/DIG. 9; 325/395, 396; 340/309.1, 309.4

[56] References Cited

UNITED STATES PATENTS

| | | | |
|---|---|---|---|
| 2,805,331 | 9/1957 | Wolford | 325/396 |
| 3,054,038 | 9/1962 | Rast et al. | 325/396 X |
| 3,681,541 | 8/1972 | Dozler et al. | 325/396 X |

*Primary Examiner*—Benedict V. Safourek

[57] ABSTRACT

TV channel program comparing on a TV set is automatically performed according to a stored program by a motor which drives the channel selection mechanism, as dictated by the stored schedule of channels versus time. A timer steps through the programparing the scheduled channel with the position of the TV channel selection mechanism, producing a signal which initiates energization of the motor and so provides a null seeking position feedback type of control for carrying out the program. The apparatus has use to select television programs for display or for recording over substantial periods when the television receiver is not attended.

5 Claims, 4 Drawing Figures

PATENTED JUN 18 1974 3,818,352

SHEET 1 OF 2

AUTOMATIC TELEVISION PROGRAMMER

The present invention relates to apparatus for automatically controlling channel selection on a conventional TV receiver in accordance with a preset schedule. More particularly, the apparatus automatically selects the channels received by a conventional TV receiver during periods several hours in duration, even while the receiver is not tended.

There are in all major areas of TV receiver use, whether the transmission is by broadcast signals or by cable transmission, a wide variety of programs carried by several channels throughout the day from early in the morning until late in the evening. As is often the case, one's time available for viewing television does not coincide with the mose desired television programs. Some have overcome this by recording on a video tape recorder the more desired TV programs, as these programs are received, and later playing back the tape on the TV receiver at a more convenient time. Television receivers are now provided with such video tape recording facilities. However, the receiver must be attended to make the recording while the desired TV program is being broadcast.

It is an object of the present invention to provide apparatus for use with or as part of conventional TV receivers by which the receiver is turned on at a preselected time and is controlled during ensuing intervals to receive preselected television programs from several channels.

It is another object of the present invention to provide apparatus for use with a conventional television receiver by which television programs received by the receiver can be screened over a predetermined interval of time, thereby preventing reception of undesirable programs during said interval.

It is another object of the present invention to provide such apparatus for use in connection with video tape recorders, whereby the received television programs are recorded on the video tape recorder in accordance with the preselection.

Some of the advantages of the present invention are that the user can by a few simple actions preset the time the TV receiver is turned on and the sequence of channel programs that are either presented to a viewer or recorded on a video tape recorder, and thus the programs are screened either for viewing or recording. In the latter case, the user can view the programs recorded at a convenient time. In the apparatus, a clock is set to the time for turning on the TV receiver and the sequence of channels to be received commencing with the set time is selected. The selection is done simply, for example, by manually interconnecting electrical terminals representing channels with electrical terminals representing time intervals.

Other objects, features and advantages of the present invention will become readily understood from the following detailed description of embodiments of the invention taken in conjunction with the drawings and particularly pointed out in the claims appended hereto.

Figure 1:
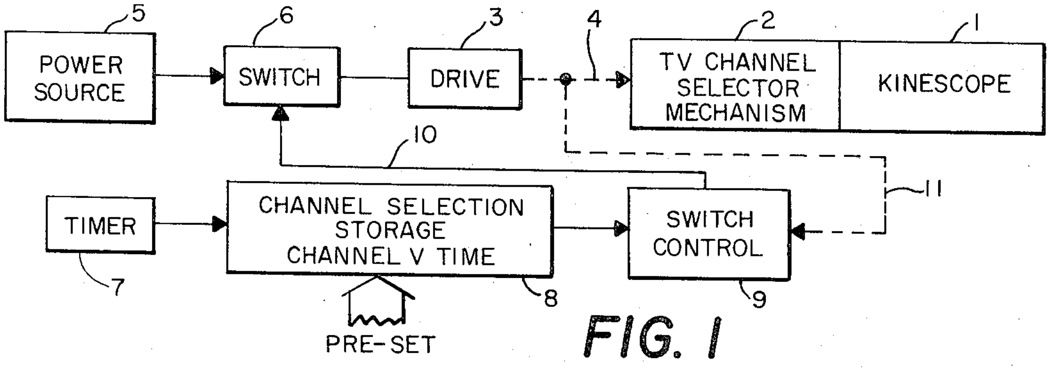
FIG. 1 is a block diagram showing the principal parts of the apparatus and their functional relationships.

Operation of apparatus incorporating features of the present invention is illustrated generally by the block diagram in FIG. 1. Here, the TV receiver which may be a conventional home television receiver is represented by the kinescope 1 and the TV channel selector mechanism 2, which is invariably a part of such a receiver. A drive mechanism 3, which may be an electric motor, mechanically drives the selector mechanism 2 via mechanical linkage 4 and this drive is controlled by power from a source 5 which may be DC or the same AC power which powers the kinescope. A switch 6 feeds this power to the drive 3, and so control of the switch controls the channel selection. This control is accomplished by a timer 7 which initiates the channel selection, a channel selection storage 8, which is preset by the user to effect the selection of channels versus time, and a switch control 9 which controls the switch 6 via line 10. The switch control in effect compares the present position of the channel selector mechanism 2 with the channel called for at that time by the storage 8 and if they are not the same, energizes the switch via line 10 to feed power to the drive 3, which drives the selector mechanism 2 until it arrives at the same channel called for by the storage. The function of the switch control 9 is carried out continually and this control may be structurally an integral part of the storage 8, which responds to a mechanical input 11 from the drive or the selector mechanism. Thus, the system shown in FIG. 1 is in mechanical terms a position feedback drive mechanism, which drives to a null signal in the feedback line 10. In addition to that, the system in FIG. 1 is preprogrammed by a schedule of TV channel versus time, so that the system mechanically carries out the schedule once it is started.

Figure 2:
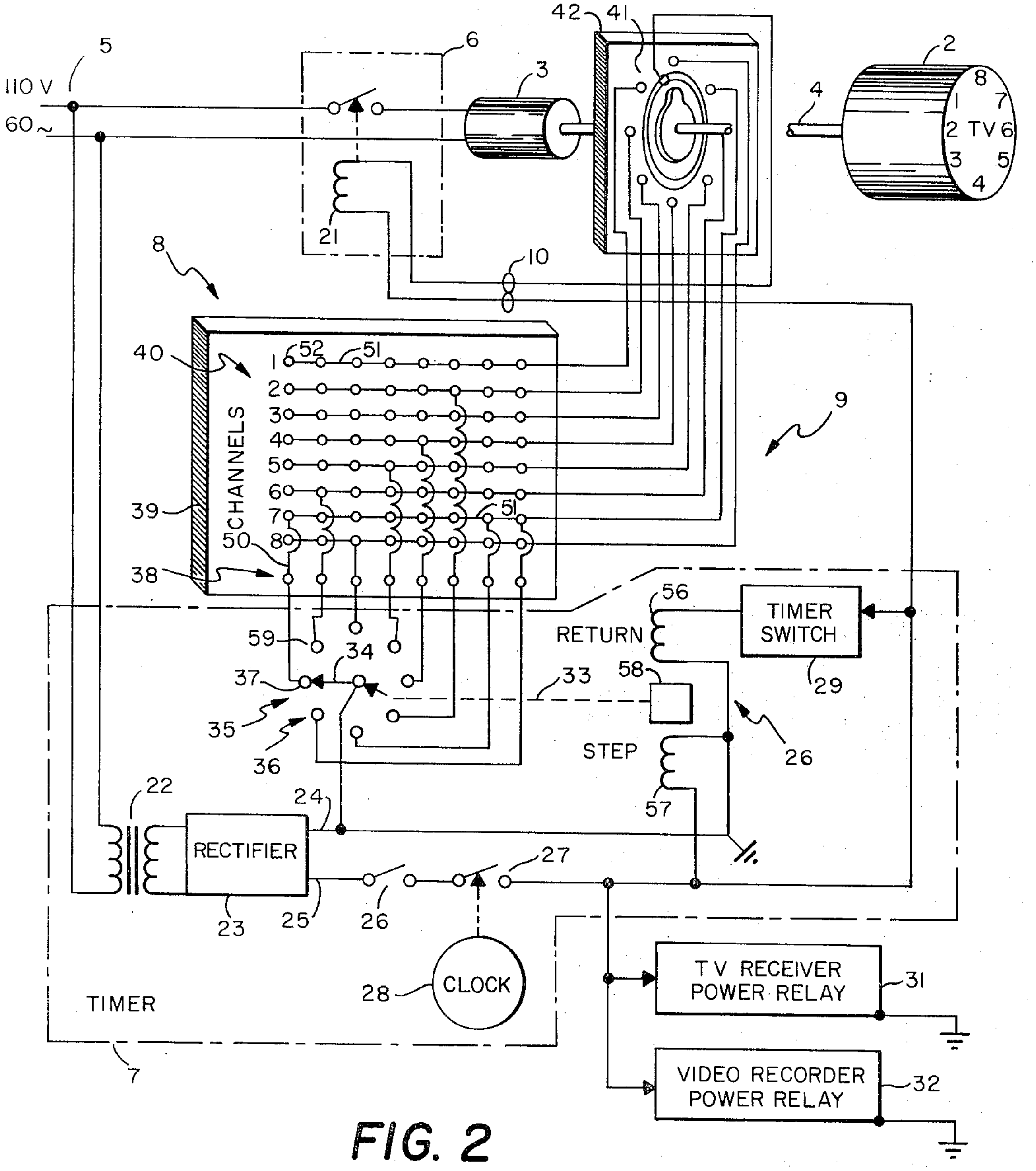
FIG. 2 is a structural diagram of the apparatus in accordance with one embodiment of the present invention.

A structure for implementing the system shown in FIG. 1 in accordance with one embodiment of the present invention is shown in FIG. 2. This apparatus is shown partly by electrical and mechanical schematic illustration and partly by perspective views of some of the mechanical parts. Where some of these parts singly or in combination function as the parts described with respect to FIG. 1, they have the same reference number. In FIG. 2, the power source 5 is 120 volt, 60 cycle power line, which energizes the motor 3 via the switch 6. This switch is a relay switch having a coil 21 which is energized via line 10. This motor drives the channel selector mechanism 2 when the motor is energized via the switch and so positions the mechanism to tune the television receiver. The mechanical coupling between the motor and the selector mechanism is provided by drive shaft 4.

AC power from the source 5 also energizes the timer 7 which includes a transformer 22 feeding a full wave rectifier 23 which provides low voltage DC power for energizing everything in the system except the motor. One terminal output 24 from the rectifier is grounded and the other 25 is at a nominal DC voltage suitable for energizing the relays in the system.

Voltage from the rectifier 23 is provided to the coils in stepping relay 26 via a system start switch 26, a program start-stop switch 27 controlled by a clock 28 and a timer switch 29.

The system start switch 26 merely arms the system so that at the predetermined time set on the clock 28, the system commences to control the reception of the television receiver. The clock is equipped with two settings, one to start the automatic control and one to stop it, and to accomplish this the clock controls the start-stop switch 27. This switch provides power to the timer 29 which sequences the stepping relay 26 and to the rest of the system and also to the TV receiver power relay 31 and the video recorder power relay 32, which in effect turn on the TV receiver and the recorder, respectively, during the period scheduled by the clock.

The timer switch 29 interrupts the DC power from the rectifier to the stepping relay 26, causing the relay to step. The stepping action of the relay is converted to a rotational step by the linking mechanism 33 to the arm 34 of rotary stepping switch 35. The terminals 36 on the rotary stepping switch are each identified with the beginning of a time interval. The first of these time intervals commences when the arm 34 is at terminal 37 of the switch, which occurs at the clock start time preset by the clock 28. Thereafter, until the clock stop time also preset by the clock 28, the switch steps from terminal to terminal, each time DC power to the stepping relay 26 is interrupted by the timer switch 29.

The intervals between steps of the stepping switch 35 are equal and preferably a quarter of an hour, a half an hour, or an hour, as these are typically the intervals of duration of television programs.

Figure 3:
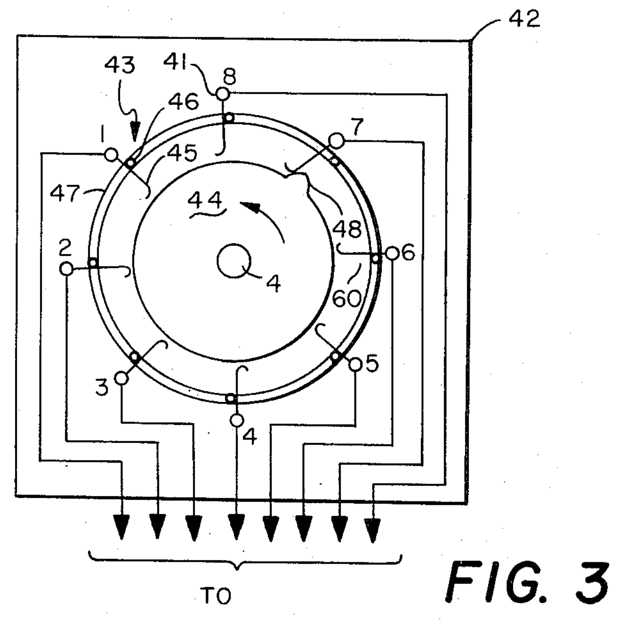
FIG. 3 illustrates the detailed structure of the channel switch cam and channel switches, which is part of the structure shown in FIG. 2.

The terminals in sequence, such as terminal 37 on the stepping switch, connect to the line of interval terminals 38 which is part of the program storage matrix 39. Also in this storage matrix 39 are the channel terminals 40, which may be arranged in a line as shown and numbered with the prevailing numbers of the TV channels. The channel terminals 40 electrically connect directly to corresponding terminals 41 on the channel switch plates 42 arranged in a circle corresponding to the positions of the channel selector mechanism 2, by which these channels are selected for reception when the shaft 4 rotates the selector mechanism. An enlarged view of the switch plate 42 and the terminals and switches located thereon is shown in FIG. 3.

Each of the terminals 41 on the channel switch plate connects to a separate one of the channel switches 43 arranged on a circle around the axis of the channel switch cam 44, which may be mounted on the rotor drive shaft 4 between the motor 3 and the channel selector mechanism 2. The arm of each of these channel switches such as arm 45 normally contacts a terminal such as 46 on conductive ring 47 and so these switches are normally closed. Each of these switches is opened when the contoured part 48 of the cam moves the switch arm away from the terminal on the conductor ring 47. This conductive ring electrically connects to the relay 21 in switch 6 to complete the circuit.

The television programs are scheduled on the program storage matrix 39 by connecting each of the interval terminals 38 to one of the channel terminals 40. This is done very simply in the embodiment shown in FIG. 2 by connecting each interval terminal 38 with one of the channel terminals by an electrical jack, such as jack 50. In this manner, each interval terminal is connected to only one channel terminal, however, a channel terminal may connect to more than one interval terminal. For purposes of illustration here 8 channel terminals are shown, each represented by a conductive strip such as strip 51 with electrical connection points, such as 52, along the strip, there being the same number of connection points 52 along a channel strip as there are interval terminals 38. While this may seem to be a redundant number of terminal points along each channel strip, they are necessary to provide the option of connecting all interval terminals with the same channel strip, in case the user wishes to program but a single channel during the entire interval set by the clock 28. The terminal point 52 along each of the strips (also called channel terminals) in association with the interval terminals 38 provide a storage matrix in which the channel-time schedule is stored by connecting the jacks such as 50 from each of the interval terminals to selected channel terminals.

In operation, the user sets the start and stop times on the clock 28, arranges the desired schedule of channels versus time on the matrix 39 and turns on the switch 25. At this point, the system is armed but not electrically energized. Thereafter, when the start time arrives according to the clock, switch 27 closes energizing the relays 31 and 32 that turn on the TV receiver and video recorder power, and also provides DC power to the relay switch 6. The relay 21 will draw current and so close the switch feeding AC power to the motor provided the channel selector mechanism 2 is not already positioned at the channel scheduled for the first time interval, during which time the stepping switch arm 34 is positioned at stepping switch terminal 37. The motor will then immediately drive the channel switch cam 44 as it drives the selector mechanism 2 until the cam opens the channel selector switch, which corresponds to the first channel selected. In the example shown in FIG. 2, since the channel selected for the first interval by jack 50 is channel 7, the motor will drive until cam 44 opens channel switch 55 which connects to the channel 7 terminal strip 51. Thereafter, when the predetermined interval, which may be 15 minutes, 30 minutes, or an hour, has transpired as determined by the timer switch 29, the timer switch will open deenergizing the return coil 56 in the stepping relay 26, while the stepping coil 57 is still energized. This will move the armature 58 of the stepping relay and by virtue of the linkage 33 between the armature and the arm 34 of the stepping switch, will rotate the stepping switch to its next terminal 59 commencing the second interval of the schedule. Since the terminal 59 on the stepping switch, as shown in the example, is connected by a jack to the strip for channel 6 in the matrix, an electrical path energizing the relay 21 in switch 6 is provided only through the corresponding channel switch on switch plate 42 (channel switch 60). As a consequence, the relay switch 6 will close, the motor will be energized and the cam will rotate, rotating the channel selector 2 until switch 60 is opened by the cam, at which point the channel selector will be at channel 6.

Figure 4:
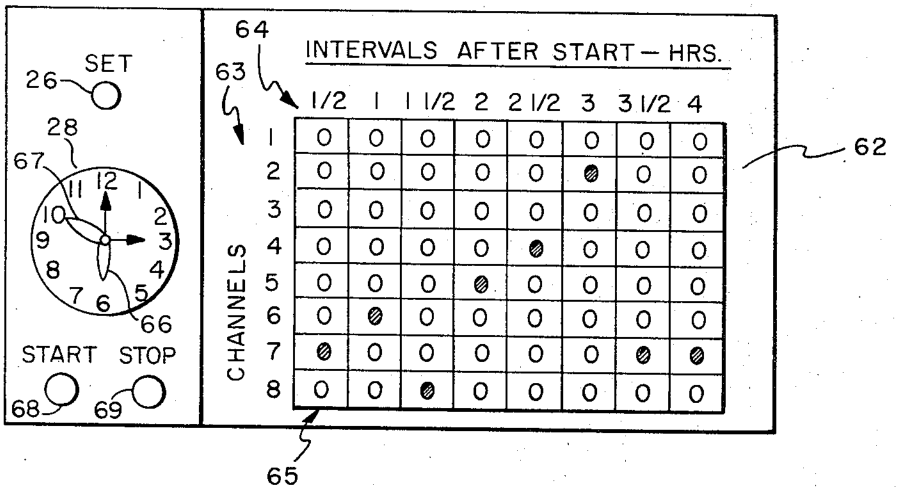
FIG. 4 shows an alternate program storage matrix structure for use in the apparatus shown in FIG. 2, whereby the starting time and selection of TV programs is made by the user.

Another embodiment of the channel-time schedule storage matrix is illustrated in FIG. 4. This structure could be substituted for the jack type panel 39 shown in FIG. 2 and includes the initiating switch 26, start and stop switch 27, and the clock 28, as well as the storage matrix. Here, a matrix of buttons 62 is presented in rows and columns. The rows are identified by channel numbers 63 and the columns are represented by half hour intervals 64. Each button controls a separate switch and each switch in a column, such as for example the first column 65, connects to the same one of internal interval terminals equivalent to terminals 38 in FIG. 2. The other side of each switch connects to the channel strip of the channel row in which the button is located, these channel strips being equivalent to strips 51 in FIG. 2. Means may be provided in the panel in FIG. 4 for lighting each button when the switch it controls is closed, thus indicating to the user that the channel-time interval selection has been made. The buttons for switches in the matrix thus actuated are shown cross hatched to indicate the program that is set. For purposes of example, the programs set by the structure in FIG. 4 is the same as set by the structure in FIG. 2.

The clock 28 has two pointers which are set, one for the start time and one for the stop time. These are denoted 66 and 67 and are set by controls, knobs 68 and 69, respectively For purposes of example, in FIG. 4 the time is shown as 3 o'clock and a schedule of TV programs is set to begin at 6 o'clock and end at 10 o'clock. Thus, at 6 o'clock and for the first half hour channel 7 is received, and then for the ensuing half hour intervals during the 4 hour period from 6 to 10 o'clock, the channels are received in the sequence 6, 8, 5, 4, 2 and during the last hour channel 7 again. At 10 o'clock the switch 27 opens turning off the TV receiver and the video recorder and the system stops. At this point, the arm 34 and stepping switch 35 will have progressed around in eight steps to terminal 37 and in readiness to commence a new schedule.

The various parts of embodiments of the present invention described herein are selected with a view toward availability, cost, and reliability and many of the parts are commercially available with a minimum of adaptation required. It is to be understood that the structural features and functions of the embodiments described are illustrative of the preferred structures, however, many modifications may be made without departing from the spirit and scope of the invention, as set forth in the appended claims.

What is claimed is:

1. Apparatus for selecting TV channels on a TV set having a channel selection mechanism comprising in combination, motor means for driving the channel selection mechanism of the TV set, means including an electrically controlled motor switch for energizing the motor, programmable means including a plurality of interval terminals and a plurality of TV channel terminals for selecting TV channels at sequential intervals, an electrically energized stepping switch having a plurality of stepping switch output terminals and a stepping switch rotor, each output terminal being connected to an associated one of said interval terminals, a source of first and second polarity dc voltage, a timer switch for coupling the first dc polarity to the stepping switch to energize the switch, said timer switch being preset to close and open at regular intervals when energized, whereby the stepping switch is energized regularly through the timer switch to sequentially move the stepping switch rotor from one of said output terminals to the next, and the said rotor being connected to the second dc polarity, whereby the interval terminals are regularly sequentially energized at the second dc polarity, and a plurality of normally closed channel position switches, one assoicated with each TV channel, one terminal of each position switch being connected to an associated one of the TV channel terminals and the other terminal of each position switch being connected to the motor switch electrical control, means driven by the motor for opening one of said position switches at a time depending on the position of the channel selection mechanism and means for electrically connecting interval terminals with TV channel terminals thereby programming TV channel selection at sequential intervals, whereby in operation, the motor is energized through the motor switch to drive the selection mechanism at the programmed sequential intervals to the programmed TV channel positions.

2. Apparatus as in claim 1 wherein, the means for selectively coupling includes removable jumper cables.

3. Apparatus as in claim 1 wherein, the means for selectively coupling includes an array of program switches each for connecting an interval terminal with a channel terminal.

4. Apparatus as in claim 3 wherein, the number of program switches in said array are sufficient to connect every interval terminal with every channel terminal.

5. Apparatus as in claim 1 wherein, the channel position switches are arranged on a circle at positions thereon which correspond to the positions of channels on the channel selection mechanism, said position switches are manually closed, and said position switches are opened by a cam which is mechanically moved with the selection mechanism, whereby the cam opens the position switch which corresponds to the channel selected by the mechanism.

* * * * *